2,789,979

BASICALLY SUBSTITUTED N-ALKYL-2-AMINO-4-HYDROXY - 5 - PYRIMIDINE CARBOXAMIDES AND SALTS THEREOF

Kurt J. Rorig, Evanston, and Robert T. Nicholson, Glenview, Ill., assignors, by mesne assignments, to G. D. Searle & Co., Skokie, Ill., a corporation of Delaware No Drawing. Application September 22, 1954,
Serial No. 457,778

9 Claims. (Cl. 260—247.2)

The present invention relates to a new group of pyrimidine derivatives and, more particularly, to basically substituted N-alkyl-2-amino-4-hydroxy-5-pyrimidinecarboxamides. These compounds can be represented by the general basic structural formula

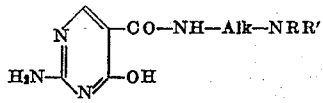

wherein Alk is a lower alkylene radical and NRR' is a lower dialkylamino or a nitrogen-containing heterocyclic radical attached to the radical Alk through the nitrogen in the heterocycle.

The radical Alk is a lower alkylene radical derived from such straight-chain or branched bivalent aliphatic hydrocarbon radicals as methylene, ethylene, propylene, butylene, amylene, hexylene, or polymethylene radicals such as trimethylene, tetramethylene, pentamethylene and hexamethylene. The radicals R and R' can be straight-chain or branched lower alkyl groups such as methyl, ethyl, propyl, butyl, amyl, and hexyl. The radical NRR' can also be a nitrogen-containing heterocycle such as a morpholino radical or a member of the pyrrolidino or piperidino series such as a 2,5-dimethyl-pyrrolidino or a 2,6-lupetidino radical.

The organic bases described herein form non-toxic salts with a variety of inorganic and strong organic acids including sulfuric, phosphoric, hydrochloric, hydrobromic, hydriodic, sulfamic, critic, lactic, maleic, malic, succinic, tartaric, cinnamic, acetic, benzoic, gluconic, oxalic, ascorbic, and related acids. They also form quaternary ammonium salts with a variety of organic esters of sulfuric, hydrohalic and aromatic sulfonic acids. Among such esters are methyl chloride, bromide and iodides; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds of our invention possess valuable pharmaceutical properties. They exert a beneficial action on the cardiovascular system and more particularly they produce a potent hypotensive effect.

Convenient starting materials for the preparation of the compounds of this invention are the lower alkyl esters of 2-amino-4-hydroxy-5-pyrimidinecarboxylic acid which can be prepared by the method of Mitter and Palit, described in the Quarterly Journal of the Indian Chemical Society, vol 2, page 61 ff.; 1925. Using their procedure, followed by recrystallization from dimethylformamide, an ethyl ester is obtained melting at about 290–292° C. with decomposition. Aminolysis of this ester with an amine of the structural formula H₂N-Alk-NRR' wherein all symbols are defined as hereinabove, yields the claimed bases. The members of this series of relatively lower molecular weight are quite water-soluble, but solubility in aqueous solutions decreases gradually with molecular weight.

The following example illustrate in further detail the compounds which constitute this invention and methods for their preparation. However, the invention is not to be construed as limited thereby in spirit or in scope as it will be obvious to those skilled in the art that numerous modifications in materials and methods can be adopted without departing from the invention. In these examples quantities of materials are indicated in parts by weight.

Example 1

A mixture of 16 parts of the ethyl ester of 2-amino-4-hydroxy-5-pyrimidinecarboxylic acid, 80 parts of γ-aminopropyldimethylamine and 80 parts of xylene is stirred at reflux for 2½ hours. The mixture initially becomes thickened, but later becomes clear in the course of the heating. The xylene and excess amine are stripped off under reduced pressure. Ethyl acetate is added to the solid residue and the mixture is slurried at reflux temperature and chilled. The white microcrystalline product is collected on a filter. On recrystallization from dimethylformamide, the N-(γ-dimethylaminopropyl)-2-amino-4-hydroxy-5-pyrimidinecarboxamide thus obtained melts at about 284–286° C. with decomposition. It has the structural formula

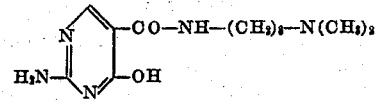

Example 2

An agitated mixture of 80 parts of β-aminoethyldimethylamine and 16 parts of 2-amino-4-hydroxy-5-pyrimidinecarboxylic acid ethyl ester is refluxed for 3 hours, cooled and freed from excess amine by vacuum distillation. The residue is slurried at reflux temperature with ethyl acetate and cooled. The precipitate is recrystallized from dimethylformamide. The N-(β-dimethylaminoethyl)-2-amino-4-hydroxy-5-pyrimidinecarboxamide thus obtained melts at about 292–293° C. It has the structural formula

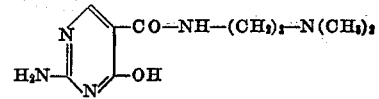

Example 3

A stirred mixture of 5 parts of 2-amino-4-hydroxy-5-pyrimidinecarboxylic acid ethyl ester and 25 parts of β-aminoethyldiethylamine is refluxed for 90 minutes, cooled and freed from the excess amine under vacuum. Ethyl acetate is poured on the residue whereupon a white microcrystalline precipitate is formed. The latter is collected on a filter and washed with ethyl acetate. The N - (β - diethylaminoethyl) - 2 - amino - 4 - hydroxy - 5- pyrimidinecarboxamide thus obtained melts at about 266–268° C. with decomposition. It has the structural formula

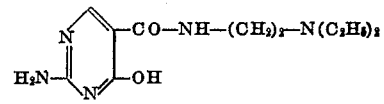

Example 4

A stirred mixture of 16 parts of 2-amino-4-hydroxy-5-pyrimidinecarboxylic acid ethyl ester, 80 parts of N-(β-aminoethyl)morpholine and 80 parts of anhydrous xylene is refluxed for 2.5 hours and then evaporated to dryness under vacuum. The residue is slurried in hot ethyl acetate and then filtered. The material collected on the filter is recrystallized from dimethylformamide. The N-(β-morpholinoethyl) - 2 - amino - 4 - hydroxy - 5 - pyrimidinecarboxamide thus obtained melts at about 287-289° C. It has the structural formula

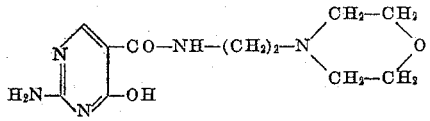

Example 5

A mixture of 16 parts of 2-amino-4-hydroxy-5-pyrimidinecarboxylic acid ethyl ester, 45 parts of N-(β-aminoethyl)piperidine and 45 parts of xylene is stirred at reflux temperature for 3 hours and then filtered. The filter cake is slurried in hot ethyl acetate and filtered. The material collected on the filter is recrystallized from dimethylformamide. An additional yield can be obtained by removal of the excess amine from the filtrate by vacuum distillation and slurrying in hot ethyl acetate. The N-(β-piperidinoethyl) - 2 - amino - 4 - hydroxy - 5 - pyrimidinecarboxamide thus obtained melts at about 290-292° C. with decomposition and has the structural formula

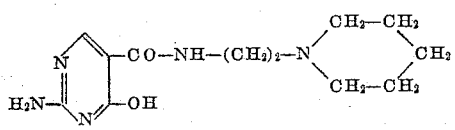

Example 6

An agitated mixture of 15 parts of 2-amino-4-hydroxy-5-pyrimidinecarboxylic acid ethyl ester, 45 parts of N-(δ-aminobutyl)pyrrolidine and 45 parts of anhydrous xylene is refluxed for 2 hours, cooled, and freed from excess amine and xylene by vacuum distillation. Ethyl acetate is added to the solid residue and the mixture is slurried at reflux temperature. After cooling the fine white precipitate is collected on a filter and recrystallized from dimethylformamide. The N-(δ-pyrrolidinobutyl)-2-amino-4-hydroxy-5-pyrimidinecarboxamide thus obtained has the structural formula

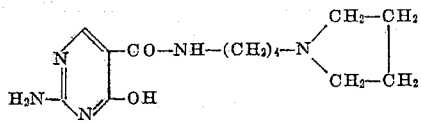

What is claimed is:
1. A compound of the structural formula

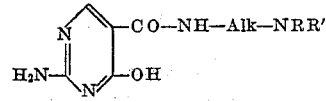

wherein Alk is a lower alkylene radical and NRR' is a member of the class consisting of di(lower)alkylamino, morpholino, pyrrolidino and piperidino radicals.

2. A compound of the structural formula

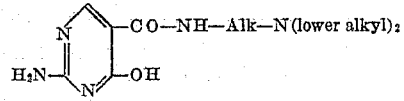

wherein Alk is a lower alkylene radical.

3. N - (β - diethylaminoethyl) - 2 - amino - 4 - hydroxy-5-pyrimidinecarboxamide.

4. An N-[dimethylamino-(lower alkyl)]-2-amino-4-hydroxy-5-pyrimidinecarboxamide.

5. A compound of the structural formula

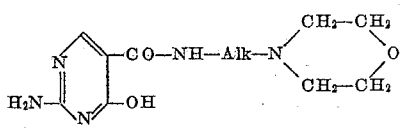

wherein Alk is a lower alkylene radical.

6. N - (β - morpholinoethyl) - 2 - amino - 4 - hydroxy-5-pyrimidinecarboxamide.

7. A compound of the structural formula

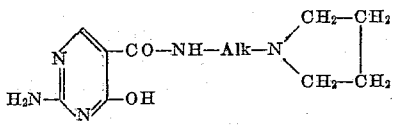

wherein Alk is a lower alkylene radical.

8. A compound of the structural formula

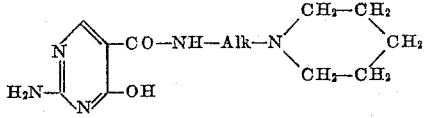

wherein Alk is a lower alkylene radical.

9. N - (β - piperidinoethyl) - 2 - amino - 4 - hydroxy-5-pyrimidinecarboxamide.

No references cited.